Nov. 22, 1966 J. L. GOOD 3,287,556
LASER LONG-PATH INFRARED MULTIWAVELENGTH
ABSORPTION SPECTROMETER
Filed Dec. 2, 1963 3 Sheets-Sheet 1

INVENTOR.
JAMES L. GOOD
BY
Lippincott, Ralk & Hendrickson
ATTORNEYS

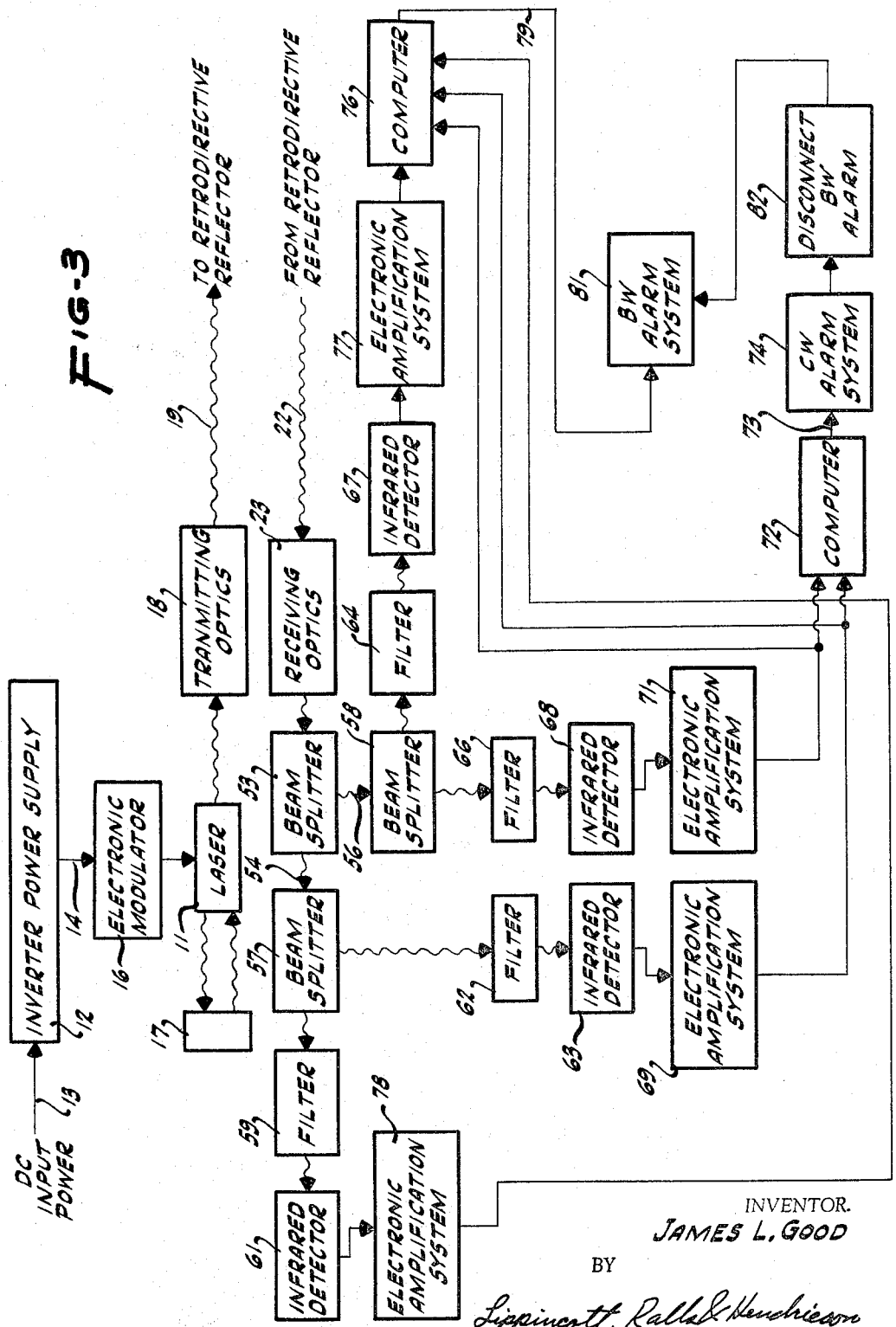

United States Patent Office 3,287,556
Patented Nov. 22, 1966

3,287,556
LASER LONG-PATH INFRARED MULTIWAVE-LENGTH ABSORPTION SPECTROMETER
James L. Good, Belmont, Calif., assignor to Textron Inc., Belmont, Calif., a corporation of Rhode Island
Filed Dec. 2, 1963, Ser. No. 327,327
7 Claims. (Cl. 250—43.5)

The present invention relates generally to infrared spectrometric systems, and is more particularly directed to a long-path infrared multiwavelength absorption spectrometer which employs a laser as the source of infrared radiation.

Long-path infrared absorption spectrometers are employed in the detection of chemical warfare agents for military purposes, and the like. Such spectrometers accomplish the foregoing by directing an infrared radiation beam containing predetermined reference and analytical wavelengths along an optical path through space. Most chemical warfare agents of interest will appreciably absorb the analytical wavelength of the infrared beam whereas the reference wavelength thereof will be substantially unabsorbed. Thus, the presence of a chemical warfare agent in the path of the infrared beam causes the intensity level of the analytical wavelength to be reduced by absorption to a level less than that of the reference wavelength. The analytical and reference wavelengths are derived from the beam received from space and the respective intensity levels of these wavelengths are detected as by means of infrared radiation detectors. The outputs of the radiation detectors are, in turn, applied to a difference integrator, for example, which is capable of providing an output signal which is indicative of differences in the respective intensity levels of the analytical and reference wavelengths. The existence of such an output signal from the integrator indicates the presence of a chemical warfare agent in the infrared radiation beam path.

Heretofore, infrared spectrometers of the type generally outlined above have employed Nernst glowers, or glow-bars, as the infrared source of the system. These conventional incoherent sources have attendant disadvantages which include fragility and relatively short life, and, of more importance, limited sensitivity which cannot be increased except at the expense of increased complexity and bulk of the spectrometer system. More particularly, in usual long-path infrared spectrometer systems, the infrared beam is commonly transmitted to a retrodirective reflector spaced from the radiation source by considerable distance, for example, of the order of 400 yards. A return beam is, in turn, directed from the reflector towards the source to be thereat received by suitable receiving optics arranged to provide the inputs to the detection system. Inasmuch as conventional infrared sources are incoherent, the transmitted infrared beam power is a direct function of the aperture size of the transmitting optics. Moreover, the dispersion of the transmitted beam from a conventional incoherent radiation source is a function of the length of the source and the focal length of the transmitting optics. For systems of reasonable size, the transmitted beam width received at the retrodirective reflector is of such large diameter that a reflecting system of unreasonable size would be required to return a significant portion of the beam energy to the receiving optics. Consequently, for systems of practical size, the transmitted beam power is very limited, as is the fraction of the transmitted beam power returned from the reflector. As a result, the power, and therefore the signal-to-noise ratio, of the beam received by the receiving optics is relatively low and limiting upon the sensitivity of the spectrometer system. The limited sensitivity is particularly prevalent in certain bands of wavelengths which might otherwise be useful in the detection of, and differentiation between various materials of interest in addition to chemical warfare agents. In particular, such limited sensitivity has heretofore precluded the use of conventional incoherent source long-path infrared absorption spectrometer systems in the detection of bacteriological warfare agents. One further disadvantage resides in the fact that conventional infrared sources cannot be modulated at high modulation rates with reasonable modulation efficiency. High modulation rates are desirable in long-path absorption spectrometer systems from the standpoint of reducing amplitude effects of atmospheric scintillations which vary inversely with the modulation rate of the infrared beam. In addition, motor driven choppers, or the like, are required in the modulation of conventional infrared sources, and such choppers are undesirable by virtue of their inherent noise generation, unreliability, maintenance requirements, and power consumption.

The present invention overcomes all of the foregoing limitations and disadvantages of conventional long-path infrared absorption spectrometers by providing an improved system wherein a laser is employed as the source of infrared radiation. In this regard, a laser is a coherent infrared radiation source and, accordingly, its transmitted beam power is not dependent on the aperture of the transmitting optics, and the beam divergence is determined by diffraction effects, rather than by the optics of the system. Not only is the transmitted beam power from a laser significantly greater than that from conventional incoherent infrared sources, but, in addition, the beam divergence is much less; a relatively small beam diameter is thereby provided at a given range. A major portion of the transmitted beam energy can, hence, be returned from a retrodirective reflector of practical size, and this, in conjunction with the relatively increased transmitted beam power, provides a substantial gain in the signal-to-noise ratio of the beam as received by the receiving optics. A signal-to-noise ratio gain, for example, of the order of several orders of magnitude is obtained over previous comparable systems. The laser long-path infrared absorption spectrometer of the present invention accordingly possesses greatly increased sensitivity and/or range over existing systems. Furthermore, various lasers, for example, helium xenon lasers, are capable of generating a number of useable wavelengths which correspond to the principal absorption bands of most bacteriological agents, as well as an absorption band which is common to most chemical warfare agents. The present invention employs such a laser in a high signal-to-noise ratio system which may, accordingly, be arranged to detect chemical warfare agents with increased sensitivity and range, as well as to detect and differentiate between various bacteriological agents. The invention further facilitates modulation of the laser beam at high modulation rates with substantially 100% modulation efficiency by purely electronic means not involving moving parts.

The invention will be better understood upon reference to the following detailed description taken in conjunction with the accompanying drawings, wherein:

FIGURE 3 is a block diagram of a modified form of laser long-path infrared absorption spectrometer which is capable of detecting and differentiating between both chemical and bacteriological warfare agents.

Figure 1:
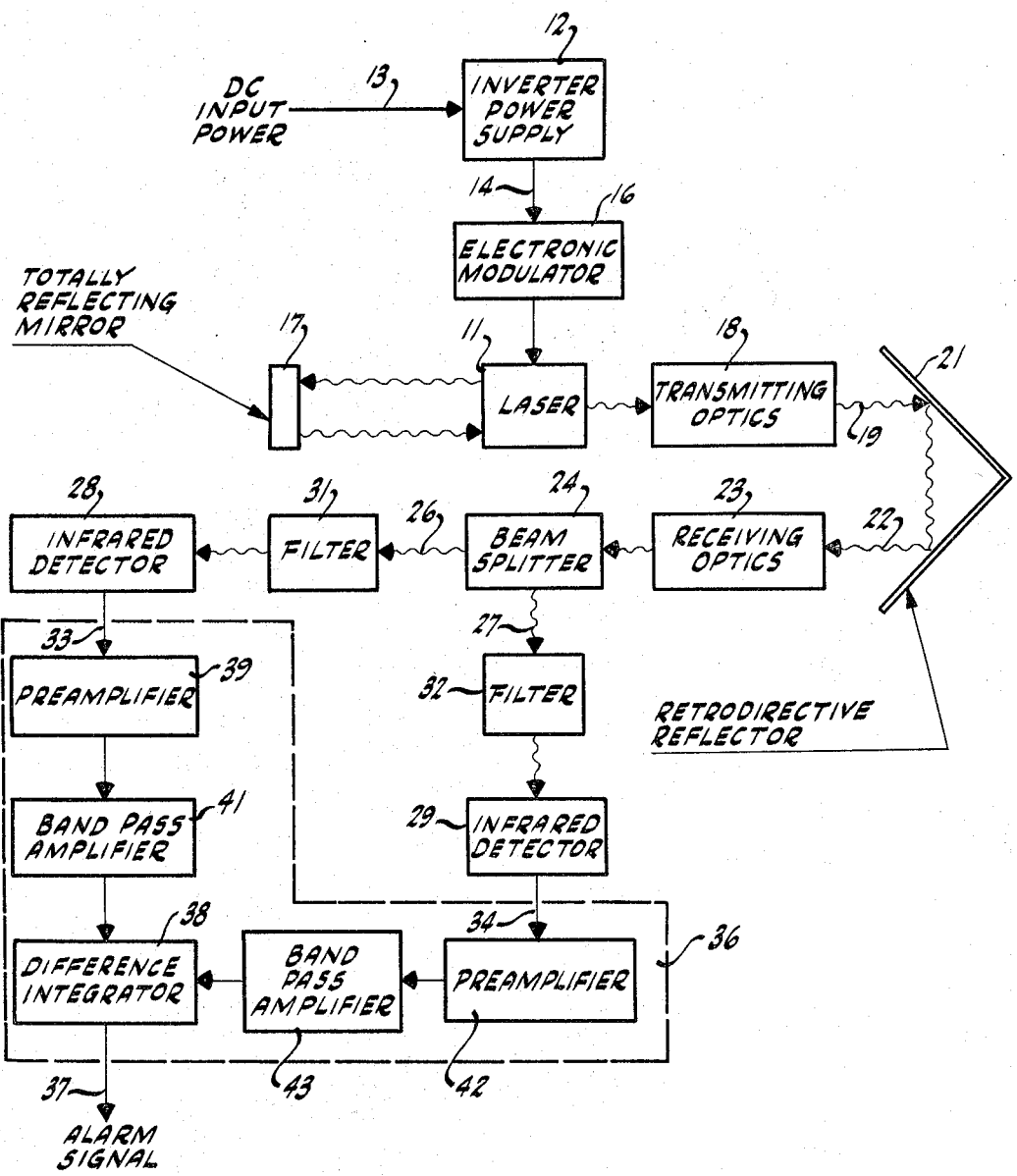
FIGURE 1 is a block diagram of one embodiment of a laser long-path infrared absorption spectrometer, in accordance with the present invention, which is particularly useful in the detection of chemical warfare agents.

Considering now the invention in some detail, and referring to the illustrated forms thereof in the drawings, there will be seen to be generally provided a long-path infrared absorption spectrometer, which employs a laser as an infrared radiation source. Means are provided to direct the laser beam along an optical path through space to a retrodirective reflector, or the like, which is displaced a substantial distance from the laser. The retrodirective reflector directs a return beam to means adjacent the laser for receiving the return beam, and separating predetermined ones of its constituent wavelengths from each other. In this regard, the predetermined wavelengths are selected to include at least one reference wavelength which is not appreciably absorbed by material of interest which may be disposed in the optical path of the beam, and one or more analytical wavelengths which are absorbed in varying amounts depending upon the particular material. Through employment of a laser as the source of infrared radiation, the return beam received from the retrodirective reflector possesses a high signal-to-noise ratio and, accordingly, even minute amounts of absorption of an analytical wavelength by a material of interest in the beam path, produces a significant decrease in the intensity of such wavelength. The spectrometer further includes means for detecting and comparing the respective intensity levels of the separated predetermined wavelengths to each other, as an indication of the existence or non-existence of materials of interest in the beam path. The material may be, for example, any of a number of colorless and odorless chemical warfare agents, all of which appreciably absorb a predetermined analytical wavelength of an infrared beam, but substantially do not absorb a predetermined reference wavelength. Consequently, detection of a significant difference in the intensity levels of the analytical and reference wavelengths indicates the existence of a chemical warfare agent in the beam path, whereas no agent is present where the respective intensity levels are observed to be substantially equal. Similarly, bacteriological agents may be detected and differentiated from one another by the utilization of a plurality of predetermined wavelengths contained in the laser beam, which are selected to correspond to principal absorption bands of most bacteriological agents. Various of the intensity level ratios of the respective wavelengths are peculiar to particular agents and, accordingly, provide a rough identification of the agent, or at least sufficient information for differentiation between various classes or species thereof.

Referring now to FIGURE 1 in detail, a laser long-path infrared absorption spectrometer of the type described above is provided which is particularly suited to the detection of chemical warfare agents, or the like. The system includes a laser 11, preferably a helium-xenon laser, which is capable of generating an intense infrared radiation beam, including at least an analytical wavelength which is significantly absorbed by the agents to be detected, and a reference wavelength for which absorption is negligible. Preferably, the analytical and reference wavelengths are in close proximity, such that they are substantially equally affected by atmospheric and other extraneous conditions. Analytical and reference wavelengths, respectively, of 9.7 microns and 9.0 microns are particularly well suited to the detection of chemical warfare agents.

The laser 11 is energized by means of an inverter power supply 12, which converts D.-C. input power, as generally indicated at 13, to A.-C. output power, as indicated at 14, having a frequency, for example, of the order of 10 kilocycles. The output power is modulated by means of an electronic modulator 16 at a frequency, for example, of 100 cycles per second for which the modulation efficiency approaches 100 percent. The modulated power, is, in turn, applied to the laser 11, resulting in modulation of the laser beam.

It is particularly important to note that the modulation of the laser infrared beam is herein accomplished entirely electronically, unlike conventional infrared sources employed heretofore with which motor-driven choppers are required to modulate the beam. Such employment of a purely electronic modulator provides substantial improvement over existing systems inasmuch as no moving parts are involved. The noise generation, unreliability, maintenance requirements, and power consumption attending choppers or equivalent modulators involving moving parts is thus eliminated. Further to the foregoing, the laser 11 emits radiation from both ends and, consequently, the same laser source may simultaneously service more than one infrared spectrometer receiver, of a type subsequently described herein. More preferably, however, a totally reflecting mirror 17 is disposed adjacent one end of the laser, so as to reflect the radiation therefrom in the same direction as that emitted from the opposite end of the laser, thereby substantially doubling the beam output power in one direction.

The beam output from the laser 11 is received by suitable transmitting optics 18, which are operable to direct a transmitted beam 19 along an optical path through space to a retrodirective reflector 21 disposed at some distance from the laser, for example, 400 yards. The retrodirective reflector reflects the transmitted beam anti-parallel to its original path, resulting in a return beam, as indicated at 22, which is directed generally toward the laser 11. Suitable receiving optics 23 are disposed adjacent the laser 11 to receive the returned beam 22.

To facilitate derivation of the reference and analytical wavelengths of interest from the return beam 22, the receiving optics 23 transmit the return beam 22 to an optical beam splitter 24, preferably a dichroic mirror. The beam splitter 24 is effective in separating the reference wavelength from the analytical wavelength, the reference wavelength being indicated at 26, and the analytical wavelength being indicated at 27. The reference and analytical wavelengths 26 and 27 are respectively directed upon infrared detectors 28 and 29, for example, thermistor bolometers, preferably through the intermediary of natural narrow band blocking filters 31 and 32 placed in front of the detectors. The filters substantially eliminate slight spectral overlaps, which may exist in the reference and analytical wavelength bands, as separated by the beam splitter, and thus substantially the pure reference and analytical wavelengths are received by the detectors. In this regard, where 9.0 microns is employed as the reference wavelength and 9.7 microns is employed as the analytical wavelength, the filters 31 and 32 are respectively preferably talc-poly and Kel-F filters. The detectors 28 and 29, in turn, generate electrical signals, as indicated at 33 and 34, which are respectively proportional to the intensity levels of the reference wavelength and analytical wavelength.

Comparison of the magnitudes of the detector output signals 33 and 34 provides an indication of the existence or non-existence of an agent of interest in the optical beam path between the transmitting and receiving systems, and the retrodirective reflector 21. More particularly, the presence of an agent in the beam path, causes some absorption of the analytical wavelength, while the reference wavelength is substantially not absorbed, and, accordingly, the intensity of the analytical wavelength is significantly reduced relative to that of the reference wavelength. Thus, there is a substantial difference between the respective magnitudes of signals 33 and 34. Conversely, the absence of an agent, the intensities of the analytical and reference wavelengths are substantially equal and there is substantially no difference between the magnitudes of the signals 33 and 34. Suitable comparison means 36 are connected in receiving relation to the outputs of the detectors 28 and 29, to receive the electrical signals 33 and 34 therefrom. The comparison means 36 are preferably arranged to produce an output alarm signal, as indicated at 37, in response to a significant difference in magnitude between the electrical signals 33 and 34, and to produce no output when the input signals are substantially equal.

The comparison means 36 may be any one of a number of differential detection circuits which will suggest themselves to those skilled in the electronics art. One such circuit as depicted in FIGURE 1, includes a difference integrator 38 and two identical amplification input channels applying the detector output signals 33 and 34 thereto. The input channels respectively preferably include a preamplifier 39, and bandpass amplifier 41, coupled between one input of the difference integrator 38 and the output of detector 28, and a preamplifier 42 and bandpass amplifier 43, connected between a second input of the integrator and the output of detector 29. The electrical characteristics of the respective amplification input channels may be readily adjusted to be substantially identical, such that any difference between the magnitudes of the signals applied to the respective inputs of the difference integrator 38 is due sloely to the differential absorption of the reference and analytical wavelengths of the radiation beam by an agent in the optical path thereof. The alarm signal 37 is then the output of the difference integrator, which output is proportional to the difference between the magnitudes of the input signals applied thereto, and therefore proportional to the respective intensity levels of the reference and analytical wavelengths.

Figure 2:
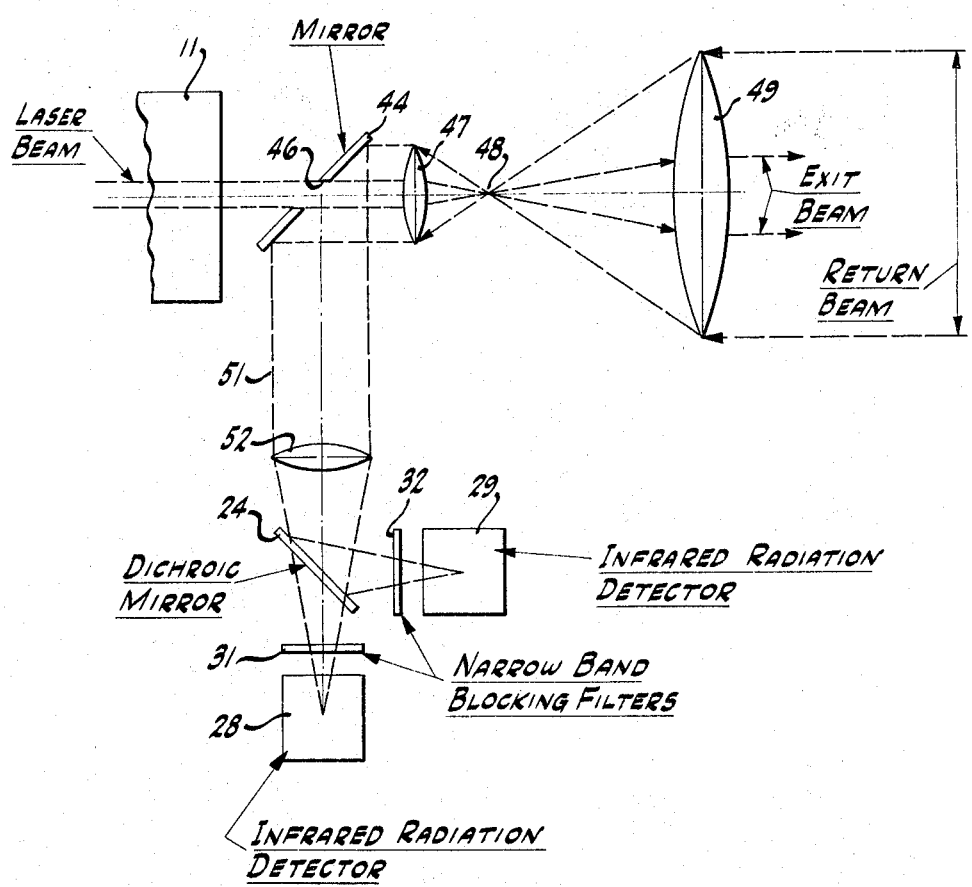
FIGURE 2 is a schematic illustration of an optical arrangement which may be employed in the embodiment of FIGURE 1.

Considering now a preferred arrangement of the transmitting and receiving optics 18 and 23, which may be employed in the long-path infrared absorption spectrometer of the present invention and referring to FIGURE 2, such optical arrangement preferably includes a 45° mirror 44 disposed adjacent the output end of the laser 11, and having a central aperture 46 substantially equal in diameter to the laser output beam and coaxially traversed thereby. A lens 47 disposed on the opposite side of mirror 44 from the laser receives the beam transmitted through the aperture 46 and brings same to a diffraction-limited focus at the focal point 48. The focused beam is, in turn, transmitted and collimated by a second lens 49, from which the exit beam 19 is directed to the retrodirective reflector 21. It is of importance to note that the output beam of the laser 11 subtends but a minor fraction of the over-all aperture of the lens 47. Similarly, the resulting exit beam focused and collimated by lens 49 subtends a similar small fraction of the over-all aperture of this lens. For example, the transmitted beam may subtend one-third of the over-all apertures of the respective lenses 47 and 49. Due to dispersion, the return beam 22 from the retrodirective reflector 21 subtends the entire apertures of both lenses 49 and 47, and therefore, except for the portion of the return beam returned to the laser, all the energy is reflected from the 45° mirror 44, as indicated at 51. Since the transmitted laser beam subtends but a small fraction of the over-all apertures of the lenses 47 and 49, a major fraction of the received energy is reflected from the mirror 44. For example, in the case noted hereinbefore wherein the transmitted beam subtends one-third of the over-all apertures of the lenses 47 and 49, approximately eight-ninths of the received energy is reflected from the mirror 44.

Since a laser is a coherent radiator, the beam divergence is determined by diffraction effects, and therefore for optimum performance the lenses 47 and 49 are preferably diffraction-limited. In this regard, the lenses 47 and 49 are advantageously aspheric in order to substantially eliminate spherical aberration, as well as to minimize coma. In addition, the lenses 47 and 49 are preferably of a material such that the variation between the refractive index for the reference and analytical wavelengths of interest is minimal. For reference and analytical wavelengths of 9.0 and 9.7 microns, lenses of anti-reflection coated germanium may be advantageously employed, inasmuch as they provide peak transmission of these two wavelengths, and the variation of the refractive index between these two wavelengths is less than .0009.

The received beam energy 51, as reflected from the mirror 44, is preferably focused by means of a lens 52 upon the infrared detectors 28 and 29, with a dichroic mirror being preferably employed in the converging beam as the beam splitter 24 for separating the reference and analytical bands of interest. As shown, the dichroic mirror transmits the reference wavelength and reflects the analytical wavelength which are, in turn, respectively transmitted through the blocking filters 31 and 32 for impingement upon the detectors 28 and 29.

Through the employment of a laser 11 as a source of coherent infrared radiation, and a transceiving optical system of the type outlined above, the relatively increased transmitted beam energy and the minimized beam divergence at a given range results in a substantial increase in the energy, and therefore the signal-to-noise ratio of the returned beam over that obtainable with conventional long-path infrared absorption spectrometer systems employing incoherent infrared sources, and optical systems of comparable aperture size. In fact, a spectrometer system, in accordance with the present invention, employing but 60% of the transceiver aperture of an incoherent system yields an increase in signal-to-noise ratio of the order of 170. Thus, greater sensitivity is obtained in accordance with the present invention, with a system of greater compactness. Furthermore, by virtue of the increased signal-to-noise ratio and coherency of the laser radiation source 11, various other wavelengths in the spectrum of the laser beam in addition to those two wavelengths employed in the system described hereinbefore, are of sufficient power level for use in detection of other agents, for example bacteriological agents, having absorption at these wavelengths. In this regard, a helium-xenon laser is particularly rich in the quantity and quality of emitted wavelengths, and various of those passed by the atmosphere are suited to the detection of bacteriological warfare agents. More particularly, in addition to the two intermediate wavelengths of relatively close proximity (9.0 microns and 9.7 microns), useful in the detection of chemical warfare agents, a relatively long wavelength, for example of the order of 12.3 microns, and a relatively short wavelength, for example of the order of 3.3 microns, are constituent wavelengths of the laser beam which are readily passed by the atmosphere. These predetermined wavelengths coincide with strong absorption bands, common to almost all organisms and the relative intensities of these wavelengths provide a criteria by which the organisms may be differentiated. For example, the relative transmission values of various of the wavelengths for several organisms, namely *Bacillus subtilis*, *Mycobacterium phlei* and *Rhizobium leguminosarum*, are set out in the following table.

| | Bacillus Subtilis | Mycobacterium Phlei | Rhizobium Leguminosarum |
|---|---|---|---|
| $T_{9.0\mu}/T_{12.3\mu}$ | 0.94 | 0.96 | 0.98 |
| $T_{9.7\mu}/T_{12.3\mu}$ | 0.94 | 0.96 | 0.98 |
| $T_{3.3\mu}/T_{9.0\mu}$ | 0.88 | 0.95 | 0.91 |

The relative transmission ratios $T_{9.0\mu}/T_{12.3\mu}$ and $T_{9.7\mu}/T_{12.3\mu}$ are common to virtually all bacteria, and are indicative of bacteria concentration. Furthermore, these ratios are substantially equal for a given bacterium, and if these ratios differ greatly, then the material absorbing the infrared radiation is probably not bacteria, but rather, a chemical warfare agent. The relative transmission ratio of the relatively short wavelength, for example 3.3 microns, to that of a longer wavelength such as 9.0 microns or 12.3 microns, varies sharply from one species of bacteria to another, and may provide a coarse identification of bacteria in the beam path or serve to differentiate one species from another. It will be accordingly appreciated that upon separation of the predetermined constituent wavelengths from the infrared beam, and comparison of the relative intensities thereof, there is provided an indication of the existence or non-existence of a chemical warfare agent in the optical beam path, the existence or non-existence of a relatively high concentration of bacteria in the beam path, and an indication of the type of bacteria, or of the specific bacteria itself. In this regard, assume that there is an increase in the concentration of Bacillus subtilis in the optical beam path. The corresponding decreases in the ratios $T_{9.7\mu}/T_{12.3\mu}$ and $T_{9.0\mu}/T_{12.3\mu}$ to 0.94 indicate with fair certainty that there is an increase in the bacteria concentration, since the attenuation at 9.0 and 9.7μ is equivalent. Were the foregoing ratios not comparable, this would be an indication that a chemical warfare agent was in the beam path. There will be an accompanying observation of a ratio $T_{3.3\mu}/T_{9.0\mu}$ substantially equal to 0.88. The relative transmissions of the same wavelengths for *Mycobacterium phlei* and *Rhizobium leguminosarum* are quite different from 0.88 and thus, this latter-observed ratio provides an indication of the type of bacteria existing in the beam path. Similarly, relative transmission ratios are peculiar to other given bacteria types, and provide a coarse identification thereof or differentiation therebetween.

With the foregoing example in mind, a long-path infrared absorption spectrometer for detecting both chemical warfare agents and bacteriological agents, may be provided in the manner depicted in FIGURE 3. It is to be noted that the system thereof is substantially similar to that depicted in FIGURE 1, with the exception that provision is made for additional analytical wavelength channels. The laser and its associated energizing components, and the transmitting and receiving optics are identical to those employed in the system of FIGURE 1, and therefore are designated by like reference numerals. Thus, the modulated laser radiation beam is transmitted by the transmitting optics 18 to the retrodirective reflector and a return beam 22 is received therefrom by the receiving optics 23 in a like manner in the systems of both FIGURE 1 and FIGURE 3. In the present instance, however, the return beam 22, as received by the receiving optics 23, in directed upon a beam splitter 53, preferably a dichroic mirror, which is operable to separate the beam into upper and lower wavelength bands 54 and 56, which are separated at a wavelength between the two predetermined intermediate wavelengths, for example the wavelengths of 9.0 and 9.7 microns. The upper band 54 thus includes the relatively long wavelength, for example 12.3 microns, and the longest of the two intermediate wavelengths, for example 9.7 microns. The low band 56 includes the relatively short wavelength, for example 3.3 microns, and the shortest of the two intermediate wavelengths, for example 9.0 microns. The upper and lower bands 54 and 56 are, in turn, directed upon beam splitters 57 and 58, respectively, which serve to separate the predetermined wavelength contained in the respective bands. The beam splitter 57 thus has an output at the relatively long wavelength, which is transmitted through a narrow band blocking filter 59 for impingement upon an infrared detector 61. The beam splitter 57 has a second output at the longest of the two intermediate wavelengths, which is similarly transmitted by a narrow band blocking filter 62, for impingement upon an infrared detector 63. Beam splitter 58 likewise has two outputs for, respectively, the relatively short wavelength and the shortest of the two intermediate wavelengths. These wavelengths are, respectively, transmitted by narrow band blocking filters 64 and 66 upon infrared detectors 67 and 68. The respective infrared detectors provide electrical output signals having magnitudes which are proportional to the intensity levels of the respective wavelengths impinging thereon. The two intermediate wavelength output signals from detectors 63 and 68 are compared to each other to provide an indication of the existence or non-existence of a chemical warfare agent in the optical beam path, and in this regard, the comparison circuit may be of the type included in the circuit of FIGURE 1. For example, the output signals from detectors 63 and 68 may be applied as by means of substantially identical electronic amplification systems 69 and 71 to inputs of a computer 72, adapted to produce an output signal, as indicated at 73, in response to a significant difference between the magnitudes of the detector signals. As noted hereinbefore, differential absorption of the two predetermined intermediate wavelengths of the infrared beam occurs for chemical warfare agents, and therefore the difference output signal 73 from computer 72 is indicative of the presence of a chemical warfare agent in the optical beam path. Such signal may be applied to a chemical warfare agent alarm system 74, which is arranged for responsive actuation.

Bacteriological warfare agent detection is facilitated as by means of a computer 76 which is arranged to compare the relative transmission ratios of the predetermined wavelengths of the infrared beam. In this regard, the intermediate wavelength outputs of amplification systems 69 and 71 are applied to inputs of the computer 76. In addition, the output of detector 67, which has a magnitude proportional to the intensity of the relatively short predetermined wavelength, is applied as by means of an electronic amplification system 77 to another input of the computer 76. Similarly, the predetermined relatively long wavelength output signal from detector 61 is applied as by means of electronic amplification system 78, to still another input of the computer 76. The computer 76 may, for example, observe the transmission ratios of the two intermediate wavelengths relative to the relatively long wavelength over a predetermined period of time and detect significant changes in the intensities thereof, indicative of a change in concentration of bacteria in the optical beam path. Suitable logic circuitry contained in the computer in response to such a change in the intermediate wavelength transmission ratios in combination with the existence of predetermined relative transmission ratios of, for example, the relatively short wavelength to one of the intermediate wavelengths then, in turn, effects the generation of an output signal, as indicated at 79, which may be employed to trigger a bacteriological warfare agent alarm system 81. In instances where the chemical warfare agent alarm system 74 is triggered, the data being fed to the computer 76 is essentially meaningless, and, accordingly, it is desirable that provision be made to disable the bacteriological warfare agent alarm system 81 under such circumstances. Accordingly, suitable disconnect means, as indicated at 82, may be advantageously coupled between the chemical warfare agent alarm system 74 and the bacteriological warfare agent alarm system 81 to disable the latter in response to actuation of the former. It will be thus appreciated that the circuit of FIGURE 3 is operable to not only detect chemical warfare agents in the beam path, but, in addition, serves to detect bacteriological agents in the path, and to differentiate between various harmful and harmless species thereof.

Although the present invention has been described hereinbefore with respect to several preferred embodiments, it will be appreciated that various changes and modifications may be made therein without departing from the true spirit and scope of the invention, and therefore it is not intended to limit the invention except by the terms of the following claims.

What is claimed is:

1. A long-path infrared differential absorption spectrometer comprising a laser generating an infrared radiation beam having a plurality of predetermined constituent wavelengths, electronic modulating means coupled to said laser to modulate said beam, a retrodirective reflector spatially separated from said laser, transmitting optical means for directing said beam through space upon said reflector, receiving optical means receiving a return beam from said reflector, optical beam splitter means associated with said receiving optical means separating said return beam into its constituent wavelengths, infrared radiation detector means receiving the respective constituent wavelengths from said beam splitter means and generating electrical signals correspondingly indicative of the intensity levels thereof, and means comparing said electrical signals for indicating differences between the intensity levels of said constituent wavelengths.

2. A long-path infrared differential absorption spectrometer comprising a laser generating an infrared radiation beam having a plurality of predetermined constituent wavelengths, a reflecting mirror disposed adjacent said laser and having an aperture transmitting said beam, a first lens disposed in alignment with said mirror and receiving said beam transmitted by said aperture, a second lens disposed in alignment with said first lens, said first and second lenses directing said beam through space, a retrodirective reflector displaced from said first and second lenses receiving said beam directed therefrom and redirecting a return beam thereto, said first and second lenses directing said return beam upon the reflecting surface of said mirror, said mirror reflecting said return beam along a predetermined optical path, a third lens disposed in said optical path for focusing said return beam, optical beam splitter means disposed to receive the return beam focused by said third lens and separate the beam into its constituent wavelengths, and detector means for detecting the intensity levels of the respective constituent wavelengths separated by said beam splitter means and indicating predetermined intensity differences therebetween.

3. A long-path infrared differential absorption spectrometer according to claim 2, wherein said beam splitter means includes a dichroic mirror for reflecting a first band of wavelengths of said return beam and transmitting a second band of wavelengths thereof, a plurality of optical beam splitters disposed relative to each other and to said dichroic mirror to separate said first and second bands into a plurality of output wavelength bands each containing a different one of said predetermined wavelengths, and a plurality of optical filters correspondingly receiving said output wavelength bands from said beam splitters and passive to the respective predetermined wavelengths contained therein.

4. A long-path infrared differential absorption spectrometer according to claim 3, further defined by said detector means including a plurality of infrared detectors respectively viewing said filters and receiving the transmitted predetermined wavelengths therefrom to produce electrical signals proportionate to the respective intensity levels of said predetermined wavelengths, electronic computer means coupled to said detectors in receiving relation to said electrical signals for producing outputs in response to predetermined differences between the levels thereof, and alarm means coupled to said computer means for actuation in response to said outputs therefrom.

5. A long-path infrared differential absorption spectrometer comprising a laser generating an infrared radiation beam including a plurality of predetermined constituent wavelengths, a retrodirective reflector spatially separated from said laser, a 45° reflecting mirror disposed adjacent said laser having a central aperture of a diameter substantially equal that of said beam, said aperture transmitting said beam, a first lens coaxially aligned with said aperture and having a central minor fraction of its over-all lens aperture subtended by the beam transmitted through the mirror aperture, said first lens bringing the beam to a diffraction limited focus, a second lens coaxially spaced from said first lens and having a central minor fraction of its over-all lens aperture collimating the focused beam and transmitting same to said retrodirective reflector, said retrodirective reflector transmitting a return beam to said second lens, said return beam subtending the over-all lens aperture of said second lens, said second lens focusing the return beam upon said first lens with the focused return beam subtending the over-all lens aperture of the first lens, said first lens collimating the focused return beam and directing same upon said 45° reflecting mirror wherefrom the return beam is reflected along a predetermined optical path, optical beam splitter means receiving said return beam from said predetermined optical path and separating said predetermined constituent wavelengths therefrom, and means detecting and comparing the respective intensity levels of said predetermined wavelengths.

6. A long-path infrared differential absorption spectrometer according to claim 5, further defined by said laser emitting radiation from opposite ends thereof, said 45° reflecting mirror disposed adjacent one end of said laser, and a totally reflecting mirror disposed adjacent the second end of said laser to reflect radiation emitted therefrom towards the first end of the laser, said radiation beam thereby including the radiation emitted from both ends of the laser.

7. A long-path infrared differential absorption spectrometer comprising a laser for generating an infrared radiation beam having a plurality of constituent wavelengths including a pair of relatively closely spaced intermediate wavelengths and at least one relatively long wavelength and at least one relatively short wavelength, one of said intermediate wavelengths being absorbed by chemical agents and the other of said intermediate wavelengths being substantially unabsorbed by chemical agents, said wavelengths being absorbed in varying amounts by bacteriological agents, a retrodirective reflector spatially separated from said laser, transmitting optical means for directing said beam from said laser through space upon said reflector, said reflector directing a return beam through space, receiving optical means disposed to receive said return beam from said reflector, a first optical beam splitter for receiving the return beam from said receiving optical means and dividing the beam into a first wavelength band including the relatively short wavelength and the shortest of said intermediate wavelengths and a second wavelength band including the longest of said intermediate wavelengths and the relatively long wavelength, a second optical beam splitter for receiving said first band from said first beam splitter and separating said relatively short wavelength and shortest intermediate wavelength from each other, a third optical beam splitter for receiving said second band from said first beam splitter and separating said relatively long wavelength and longest intermediate wavelength from each other, infrared radiation detectors for receiving the respective wavelengths from said second and third beam splitters and generating electrical signals having magnitudes proportional to the intensities thereof, first computer means coupled to the outputs of said detectors receiving said intermediate wavelengths for generating an output signal in response to a predetermined difference between the magnitudes of the signals therefrom as an indication of the existence of a chemical agent, second computer means coupled to the outputs of all of said detectors for generating an output signal in response to predetermined differences between the magnitudes of the signals therefrom as an indication of the existence of a bacteriological agent, a chemical agent alarm coupled to the output of said first computer means for actuation in response to output signals generated therefrom, a bacteriological agent alarm coupled to the output of said second computer means for actuation in response to output signals generated therefrom, and disabling means coupled between said chemical agent and bacteriological agent alarms for de-actuating the latter in response to actuation of the former.

References Cited by the Examiner

UNITED STATES PATENTS

| | | | |
|---|---|---|---|
| 2,930,893 | 3/1960 | Carpenter | 250—83.3 |
| 3,004,664 | 10/1961 | Dreyfus | 250—43.5 |

OTHER REFERENCES

Applied Optics, Supplement on Optical Masers, 1962, pp. 24–39.

Nature, Pulsed Gaseous Masers, by Boot et al., vol. 197, Jan. 12, 1963, pp. 173, 174.

RALPH G. NILSON, *Primary Examiner.*

JAMES W. LAWRENCE, *Examiner.*

S. ELBAUM, *Assistant Examiner.*